United States Patent [19]

Benedek et al.

[11] Patent Number: 4,491,039
[45] Date of Patent: Jan. 1, 1985

[54] SAFETY IGNITION INTERLOCK SWITCH FOR VEHICLE TRANSMISSION

[75] Inventors: Vasile Benedek, Bruhl; Volker Hückler, Radolfzell, both of Fed. Rep. of Germany

[73] Assignee: Deere & Company, Moline, Ill.

[21] Appl. No.: 438,433

[22] Filed: Nov. 2, 1982

[30] Foreign Application Priority Data

Nov. 18, 1981 [EP]  European Pat. Off. ........ 81305451.7

[51] Int. Cl.³ ............................................. B60K 41/04
[52] U.S. Cl. ............................................. 74/850; 74/878
[58] Field of Search ............. 74/477, 850, 878; 200/61-91

[56] References Cited

U.S. PATENT DOCUMENTS

| | | | |
|---|---|---|---|
| 2,624,211 | 1/1953 | Dunn | 74/854 |
| 3,242,280 | 3/1966 | Krieger | 200/61.91 |
| 3,534,637 | 10/1970 | Tomlinson | 74/850 |
| 3,540,313 | 11/1970 | Maurice et al. | 74/850 |
| 3,587,351 | 6/1971 | Keller | 74/850 |
| 3,780,602 | 12/1973 | Thornley | 74/850 |
| 4,277,983 | 7/1981 | Izumi et al. | 200/61.91 X |
| 4,355,549 | 10/1982 | Reinhard et al. | 74/850 |

FOREIGN PATENT DOCUMENTS 2426319 12/1974  Fed. Rep. of Germany ........ 74/850

Primary Examiner—George H. Krizmanich
Assistant Examiner—Dirk Wright

[57] ABSTRACT

A device detects when both of a pair of selector rods of a transmission are in neutral and actuates a switch part fixed in the top of a housing of the transmission to enable the engine ignition circuit. One of the rods carries a bracket on which is pivotally mounted a lever which has a lower arm which cooperates with a cam track on the other rod. When either selector rod moves in either direction out of neutral, a tip of the lower arm drops into one or the other of two recesses of the cam track and the lever drops. An upper arm of the lever then releases pressure on an operating button of the switch part.

4 Claims, 3 Drawing Figures 4,491,039

SAFETY IGNITION INTERLOCK SWITCH FOR VEHICLE TRANSMISSION

BACKGROUND OF THE INVENTION

The present invention relates to a safety ignition interlock switch device for a vehicle transmission.

The need for safety ignition interlock devices in tractors and other vehicles is well known. Such a device prevents the engine of the vehicle from being started when the transmission is engaged and avoids the risk of accidents being caused by the vehicle jumping into movement unexpectedly when the engine is started. Some tractors and other vehicles have selector mechanisms with two selector rods which select different sets of gears. Such mechanisms are known in synchronized and crash gearboxes and also in transmissions with a plurality of gear groups or ranges, for example, the transmission described in commonly assigned U.S. patent application, Ser. No. 302,327, filed Sept. 15, 1981, now U.S. Pat. No. 4,438,657. Both selector rods have neutral positions and, although a mechanical interlock ensures that only one rod can be out of neutral at any time, it remains necessary to check that both rods are in neutral to provide the safety interlock for the ignition circuit.

Safety ignition interlock devices are known in commercially available tractors in which the switch element is a plunger which slides in a bore in the bracket perpendicular to the parallel selector rods. The plunger is a grounded contact which, in its first position, presses against a fixed contact mounted in insulated fashion through an adjacent part of the transmission housing. Although this device performs the required function, it is not suitable for use with all transmissions. Vehicle transmissions are invariably compactly designed units with a high density of components. The space available for fitting a safety switch device is restricted. Moreover, the fixed part of the device, such as the fixed contact, has to be at an accessible location where it can be installed in the housing and reached for maintenance. In fact, it is found that in some transmissions, the required position for the plunger of the known device interferes with a component of the transmission itself and it is therefore impossible to install the known device in such a transmission.

SUMMARY OF THE INVENTION

An object of the present invention is to provide a safety ignition interlock device which can be installed in a transmission with a pair of parallel sliding selector rods.

This and other objects are achieved by the present invention which provides a safety ignition interlock mechanism for a transmission with first and second parallel sliding selector rods. A bracket mounted on the first rod carries a movable switch element engageable with a cam track carried by the second rod. The switch element is moved to a first state when both rods are in neutral positions and is moved to a second state when either rod is out of its neutral position.

For added safety, the device is preferably fitted to the selector mechanism of the transmission, rather than to another part, such as the gear lever. This ensures that the device acts reliably, regardless of tolerances and adjustments in the linkage to the selector mechanism.

DETAILED DESCRIPTION

Figure 1:
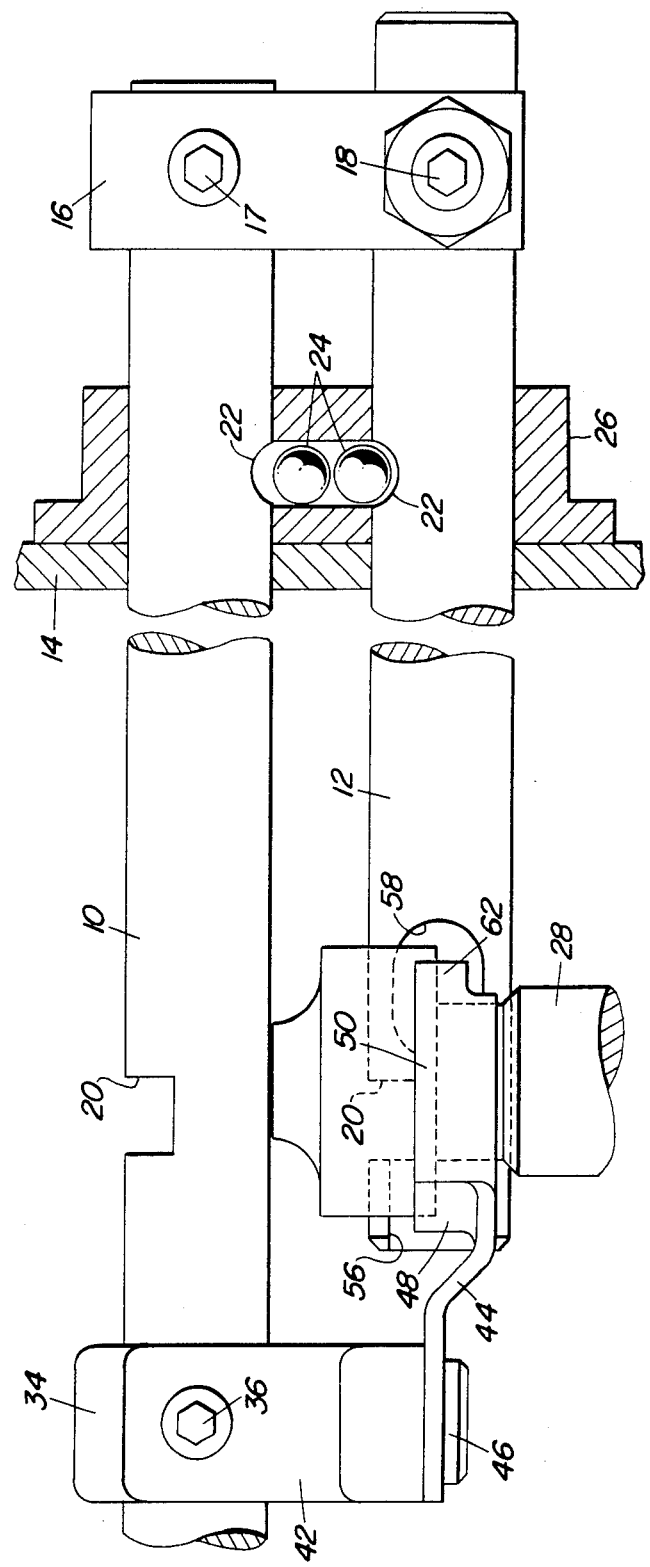
FIG. 1 is a plan view of the selector rods of a vehicle transmission and a switch device embodying the invention.

Referring firstly to the plan view of FIG. 1, first and second selector rods 10 and 12 are slidably mounted parallel to each other through the front wall 14 of a transmission housing. Front is to the right in FIGS. 1 and 2. In all three figures, the selector rods are both shown in their neutral position. The rods are additionally guided outside the housing by a guide 16 fixed on the rod 10 by a screw 17 and provided with a set screw 18 and lock nut for adjusting the sliding tolerance of the shifting fork on the collar of the selector mechanism. The linkages, whereby the rods are operated and the further parts of the selector mechanism which they, in turn, operate, form no part of the invention and are not illustrated, although the notches 20, which are engaged by selector levers, can be seen.

Outside the housing, the rods have facing cylindrical notches 22 which cooperate in a known way with a pair of balls 24 trapped in a housing 26 attached to the main housing wall 14. The balls 24 allow either one of the rods 10 and 12 to be moved out of the neutral position into a gear-engaging position. However, it is impossible to move both rods out of the neutral position because the clearance between the rods exceeds the double diameter of the balls.

Extending above the rods 10 and 12 is a component 28 of the transmission itself. The function of this component is of no importance to the present invention, but it is important to note that it is located precisely where it is desired to mount a fixed switch part 30 (FIGS. 2 and 3) in the upper wall 32 of the transmission housing.

A bracket 34 is fixed firmly onto the first rod 10 by a bolt 36 with a tapered end 38 wedged into a complementary bore 40 extending down through the shaft 10. On the upper side of the bracket 34, an arm 42 extends transversely of the rod 10 so as to overhang the axis of the second rod 12. A switch element in the form of a lever 44 is pivotally mounted on a stud 46 carried by the bracket arm 42. The lever 44 extends generally along and above the second rod 12 and is vertically pivotable about the stud 46.

Figure 2:
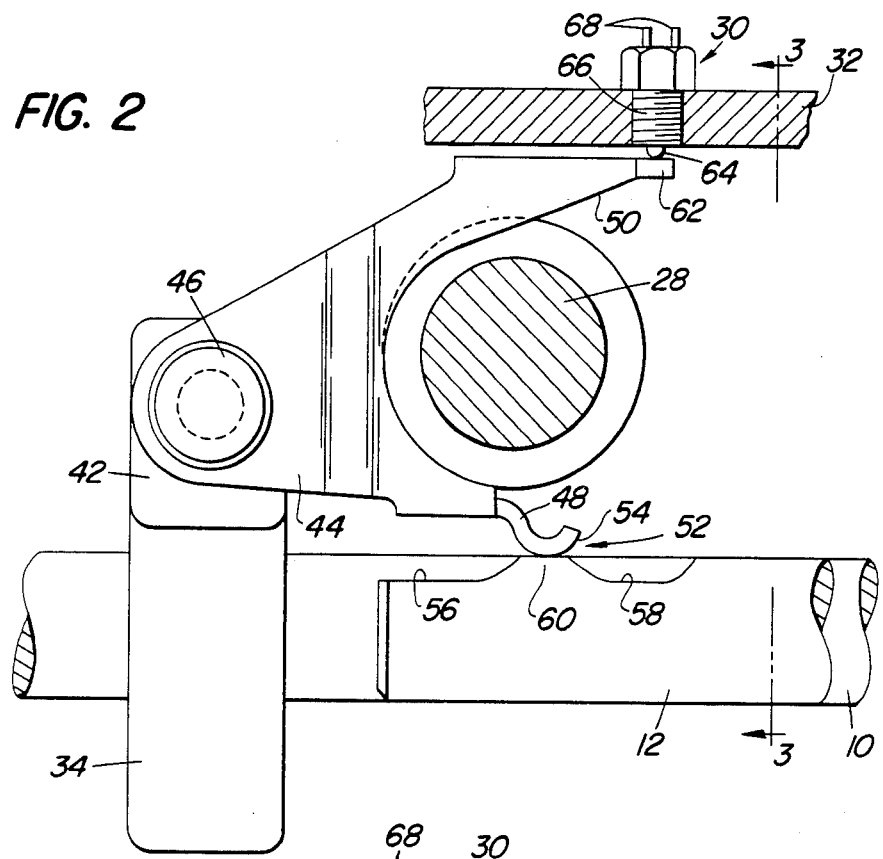
FIG. 2 is an elevation of the left-hand part of FIG. 1.
Figure 3:
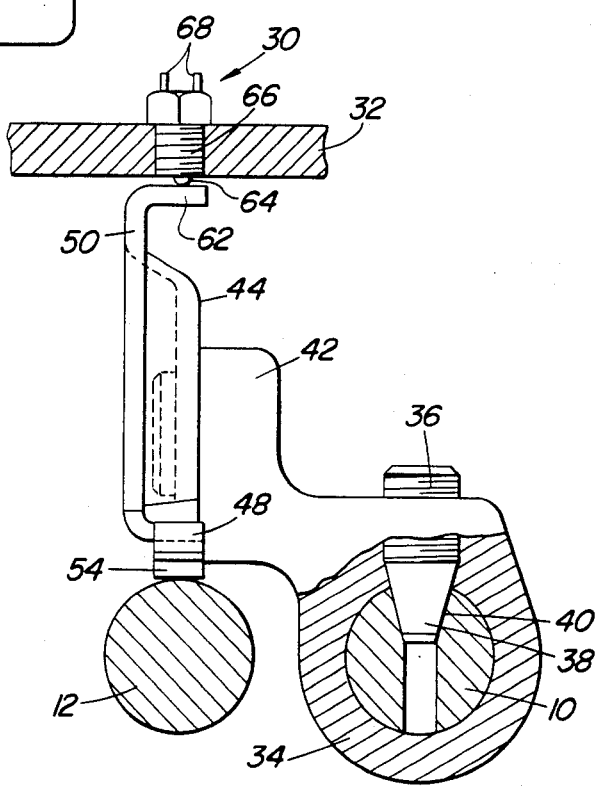
FIG. 3 is a section on the line 3—3 of FIG. 2.

Referring more particularly of FIG. 2, the lever 44 has a lower arm 48 extending underneath the transmission component 28. A second arm 50 extends above the component 28. The lower arm 48 has a rounded tip 54 which cooperates with a cam track 52 formed on top of the rod 12 by milling out two axially spaced recesses, 56 and 58, so as to leave a land 60 therebetween. When the tip of the arm 48 rests on the land 60, as shown, the lever 44 is in a first raised position. When the tip of the lower arm 48 is off the land and in either of the recesses 56, 58 the lever drops to a second, lower position.

The upper arm 50 of the lever has a tip 62 which cooperates with a button 64 of the fixed switch part 30. This fixed switch part is a known form of electrical switch with a body 66 screwed into the top wall 32 of the transmission housing. The button 64 is the tip of a spring-biased plunger which, when pushed into the body 66, completes a circuit between two terminals 68 by means of which the device is connected into the ignition circuit to effect the safety interlock in any conventional manner.

In the illustrated position, the lever 44 is raised and the button 64 is pushed in to complete the circuit and thereby allow the engine to be started. If either selector rod 10 or 12 is out of the neutral position, the lever drops and releases the button 64 so that the circuit is broken and the engine cannot be started. For example, if the lever 12 (FIG. 2) is moved out of its neutral position, either to the right or to the left in the drawing, the recess 56 or the recess 58 moves underneath the tip 54 of the lever arm 48 so that the lever drops. Equally, if the first rod 10 is moved either to the right or to the left, the top 54 will move off the land 60 and into the recess 58 or 56 so that again, the lever drops and releases the button 64. These possibilities are exhaustive because it is not possible to move both of the rods 10 and 12 out of the neutral position, by virtue of the interlock provided by the balls 24, as described above.

The invention thus achieves the desired results in spite of the presence of the transmission component 28 which lies in the way of a direct line of action between the cam track 52 and the fixed switch part 30. The upper and lower arms 50 and 48 of the lever 44 straddle the component 28 with sufficient space between the arms to avoid any interference. The invention is naturally not restricted to the particular construction shown in the drawings. The two lever arms can be located and shaped, as required, to cater for the problems created by any particular transmission layout. In fact, the position of the bracket 34, the position where the lever 48 cooperates with the cam track and the position where the lever 50 cooperates with the fixed switch part can all three be determined more or less independently to give the designer maximum freedom in adapting the device to the problems posed within the confines of any given transmission design.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications, and variations which fall within the spirit and scope of the appended claims.

We claim:

1. A safety ignition interlock switch mechanism for a vehicle transmission having first and second parallel selector rods slidable with respect to a transmission housing, comprising:
    a switch part;
    a bracket mounted on the first rod and axially spaced from the switch part; and
    a switch element carried by the bracket, the switch element comprising a lever pivoted in the bracket and having a first arm engageable with a cam track on the second rod and a second arm operatively engaging the switch part, the switch element cooperating with the cam track to move to a first position when both rods are in neutral positions and to move to a second position when either rod is out of its neutral position.
2. The mechanism of claim 1, wherein:
    the selector rods are laterally spaced, the bracket having a part overhanging an axis of the second rod, the lever pivoting vertically above the second rod, and the first arm cooperating with the cam track on a top surface of the second rod.
3. The mechanism of claim 2, wherein:
    the second lever arm is above the first lever arm, adjacent a top wall of the transmission housing, the switch part being fixed to the top wall of the transmission housing.
4. The mechanism of claim 1, wherein:
    the two lever arms straddle a component of the transmission.

* * * * *